United States Patent [19]

Klaase et al.

[11] Patent Number: 4,588,537
[45] Date of Patent: May 13, 1986

[54] METHOD FOR MANUFACTURING AN ELECTRET FILTER MEDIUM

[75] Inventors: Petrus T. A. Klaase, Voorburg; Jan van Turnhout, Pijnacker, both of Netherlands

[73] Assignee: Minnesota Mining and Manufacturing Company, St. Paul, Minn.

[21] Appl. No.: 661,365
[22] PCT Filed: Feb. 2, 1984
[86] PCT No.: PCT/US84/00149
§ 371 Date: Feb. 2, 1984
§ 102(e) Date: Oct. 4, 1984
[87] PCT Pub. No.: WO84/03193
PCT Pub. Date: Aug. 16, 1984

[30] Foreign Application Priority Data

Feb. 4, 1983 [NL] Netherlands ............ 8300437
Feb. 4, 1983 [NL] Netherlands ............ 8300439

[51] Int. Cl.⁴ .............................................. B29C 71/04
[52] U.S. Cl. ...................................... 264/22; 29/592 E; 55/155; 55/DIG. 5; 264/248; 264/DIG. 48
[58] Field of Search ............ 264/22, DIG. 48, 288.4, 264/290.2, 248, 24; 55/DIG. 5, 155, DIG. 39; 29/592 E

[56] References Cited

U.S. PATENT DOCUMENTS

Re. 30,782 10/1981 van Turnhout .................. 264/22
4,375,718 3/1983 Wadsworth et al. ............ 264/22

Primary Examiner—Donald Czaja
Assistant Examiner—Mary Lynn Fertig
Attorney, Agent, or Firm—Donald M. Sell; James A. Smith; Edward T. Okubo

[57] ABSTRACT

The present invention relates to a continuous method for manufacturing an electret filter medium from dielectric material having an open or porous structure, said method comprising the steps of continuously feeding a web of dielectric material with a substantially closed dielectric foil adjacent to at least one major face thereof into a corona discharge device, reducing the thickness of the web of dielectric material and charging the web of reduced thickness dielectric material by means of a corona discharge and to apparatus for carrying out said method.

21 Claims, 8 Drawing Figures

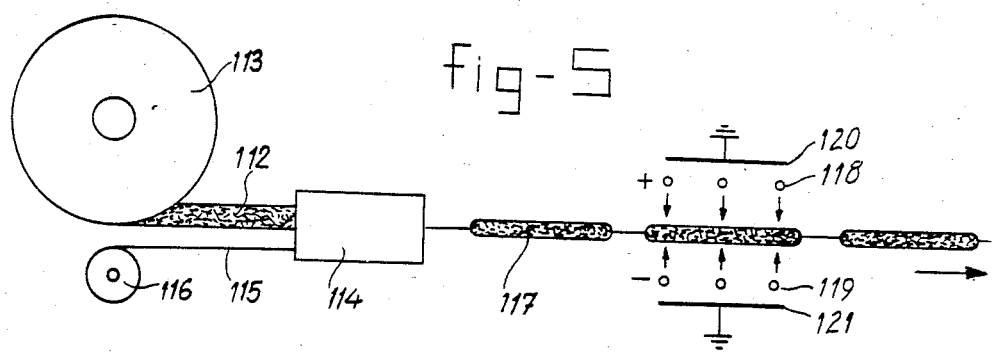
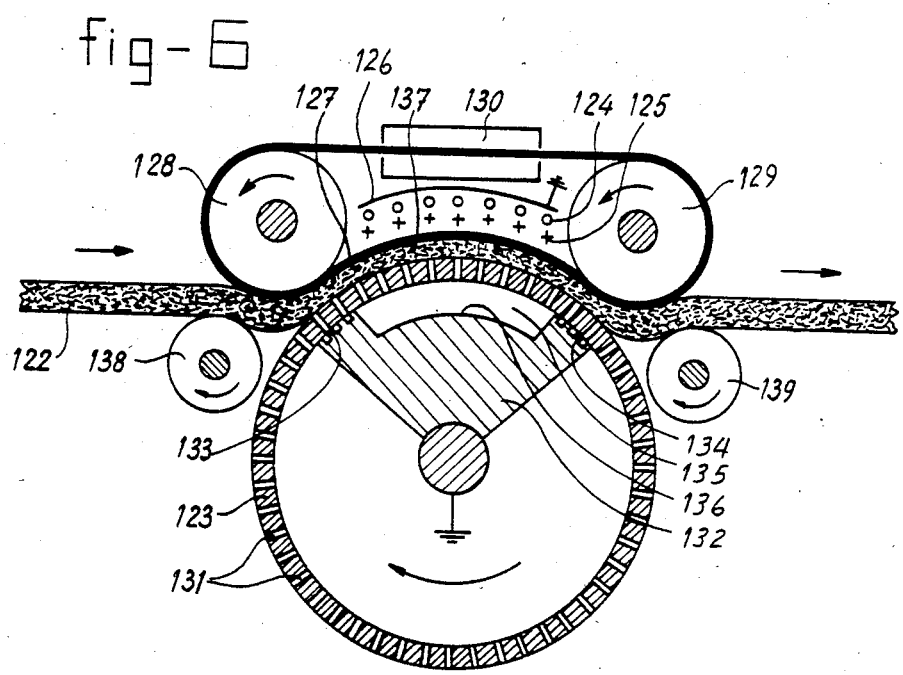

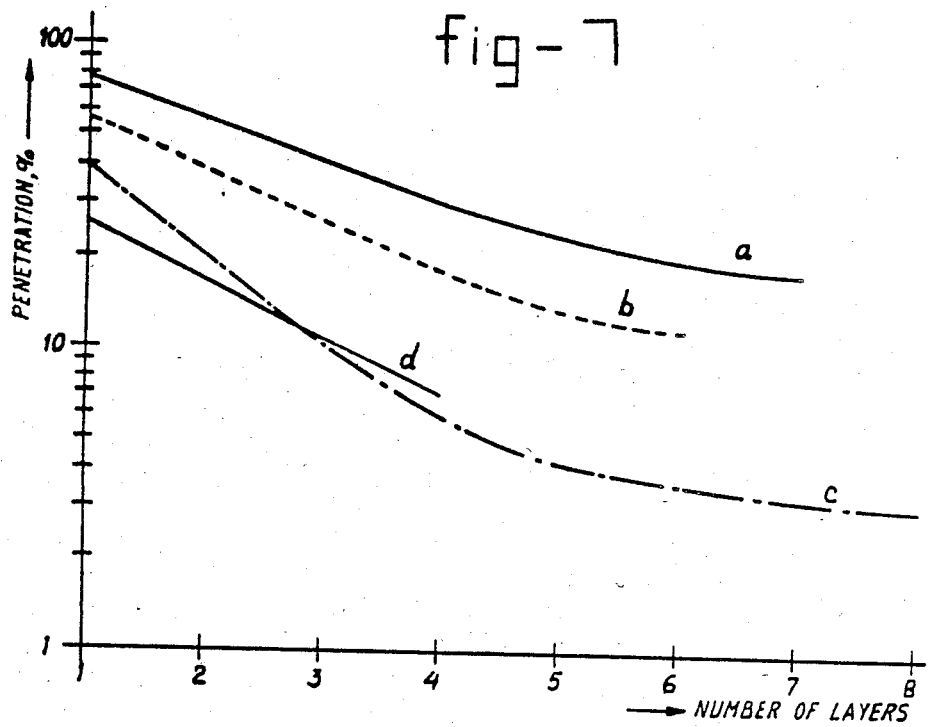
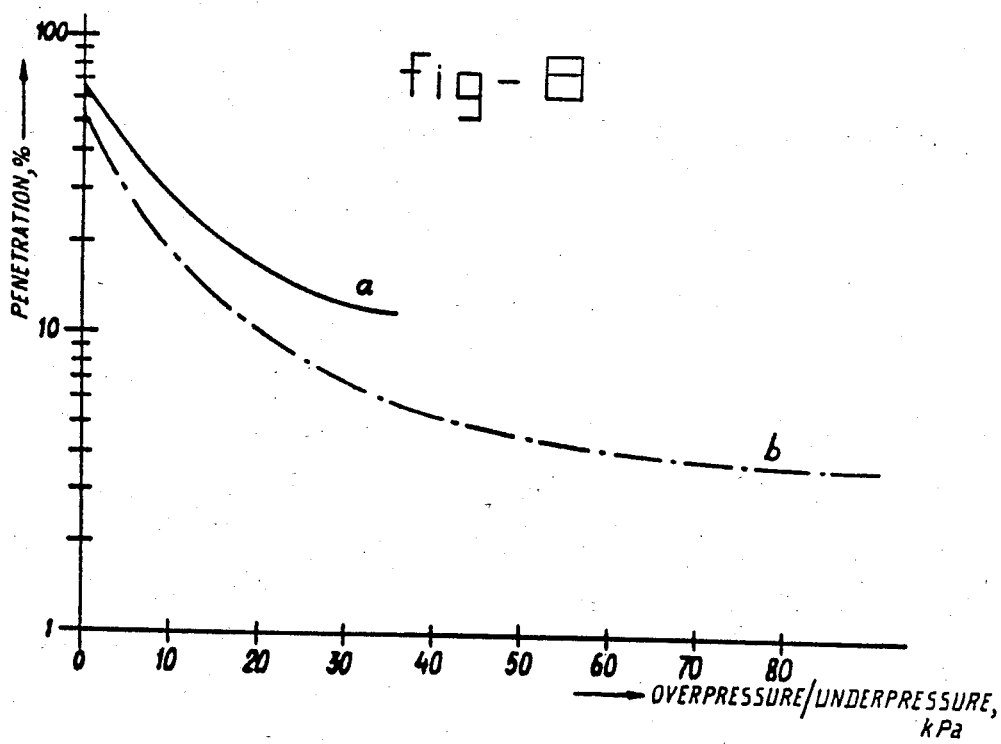

METHOD FOR MANUFACTURING AN ELECTRET FILTER MEDIUM

The present invention relates to a continuous method for manufacturing an electret filter medium from dielectric material having an open or porous structure, said method comprising the steps of continuously feeding a web of dielectric material with a substantially closed dielectric foil adjacent to at least one major face thereof into a corona discharge device, reducing the thickness of the web of dielectric material and charging the web of reduced thickness dielectric material by means of a corona discharge and to apparatus for carrying out said method.

A somewhat analagous but discontinuous, high-temperature method for manufacturing an electret filter medium is disclosed in U.S. Pat. No. 4,308,223. In said method, a filter web of polypropylene fibers of a relatively high basis weight, viz., 410 g/m$^2$ and a thickness of 2 mm is charged by two effects, viz., orientation of dipoles and implantation of charges into the fibers. For optimum orientation of the dipoles, the charging is conducted at a high temperature (120° C.) and consequently, requires quite a long time, viz., 15 minutes in total. The charging is carried out by inserting the mat between two electrodes, one of which is provided with a large number of corona points connected to a high DC-voltage. The other electrode is earthed and covered with a dielectric foil for the purpose of preventing the ions produced by the corona from flowing to earth. In order to inject negative $CO_3$-ions, a negative corona voltage is used. For the purpose of improving the uniformity of the charging of the filter medium, the corona points are positioned in close proximity to one another on the upper electrode. The coronas originating from the points oppose one another and are operative over a limited distance (a few millimeters). The points are positioned a short distance above or in the filter material to be charged. High corona voltages cannot be used because they cause sparking from the points to the grounded electrode. The risk of sparking is notably greater when the points are pressed into the filter material. The sparks can cause a short circuit which may produce holes in both the foil and the filter material. The holes in the foil may even become so wide that the foil is rendered useless. The holes in the filter material allow the passage of dust particles at an unacceptable rate.

Because the points as well as the upper electrode are at a high voltage the arrangement can be unsafe. A further problem is that the filter material is attached with screws onto the lower electrode so that part of the filter material remains uncharged and has to be discarded.

Furthermore, the charging is somewhat variable as appears from the penetration data in Table II of U.S. Pat. No. 4,308,223. This variation from 1.3 to 7 mg. penetration is likely due to the non-uniform charging of the filter material in which some parts of the filter material are not charged optimally.

U.S. Pat. No. 4,375,718 discloses a continuous, room-temperature process for manufacturing an electrostatically charged filter medium. In this method, a web of non-conductive, thermoplastic fibers is contacted on each side with a more conductive web to form a combined composite web. The composite web is charged by corona charging elements of opposite polarity on opposite sides of the composite web.

The present invention is directed to a continuous method of manufacturing an electret or electrostatic filter medium having superior filtration performance compared to media produced by prior art methods. The use of a substantially closed supporting dielectric foil has the advantage of protecting against electrical breakdown or sparks during the charging process.

The method according to the present invention is very well suited for a continuous process. Since the charge injection is so strong, it is not necessary to aim at orientation of permanent dipoles and one may start with dielectric materials without polar groups. These have a much higher insulation resistance than do polar dielectric materials thereby considerably improving the long-term stability of the injected charges. Moreover, the method according to the invention can be carried out at room temperature.

The charge injection is preferably done by means of a corona, generated, e.g., with thin tungsten wires. Although either a positive or a negative corona can be used, the charging is conveniently carried out with two coronas, a positive one at one side and a negative one at the other side of the combination of dielectric material and dielectric foil. In this arrangement one corona brings about the charge injection while the other functions as a counter-electrode. Said arrangement has the advantage that the risk of catastrophic breakdown through the dielectric foil and/or the material to be charged is low, because instead of a metal counter-electrode, one of the coronas, viz., a plasma of air ions, acts as the counter-electrode. Over said plasma-type counter-electrode the dielectric foil can be moved rapidly and without friction, this being of great importance in a continuous charging process.

Since a too heavy and/or a too thick filter web cannot be charged highly enough to obtain the desired low penetration for fine dust particles, the electret filter web can be built up as a stack of a number of layers which are charged separately. Next, the layer structure can be eliminated by, e.g., needle tacking or heat sealing.

The superior charging of the dielectric material is achieved if the thickness of the dielectric material is reduced during charging. It is possible to permanently reduce the thickness of the dielectric material by compressing it before charging so that it does not recover. This might be the case in the fabrication of a molded shape from an open dielectric material. The thickness of the material can also be reduced by stretching in the direction of its length and/or width. This applies in particular to a material that can be elastically deformed, such as foam. Temporary stretching during charging has the additional advantage that the area weight of the material is decreased.

Reduction in thickness can be achieved by pressing an open gauze or net onto the dielectric material, e.g., by means of rollers over which the gauze is run being positioned so as to press against the web. Also, it is possible to apply a pneumatic overpressure to a substantially closed foil lying on top of the dielectric web and by this means achieve compression.

Reduction in thickness is preferably achieved by placing the dielectric material into a substantially gas-tight space, at least one of the boundaries of which is flexible and is perpendicular to the thickness of the dielectric material, and drawing a partial vacuum in the sealed space. Said gas-tight space can comprise an envelope of substantially closed dielectric foil immediately adjacent to the open dielectric material.

Surprisingly, and unexpectedly, it has been found that the result of said charging under partial vacuum, as evidenced by filter penetration data, is better than achieved by charging under other methods of compression. Moreover, the vacuum method allows a high reduction in thickness (a factor of 5 or more) to be achieved conveniently.

When a dielectric filter material with a curved surface, such as is used, e.g., in respirators, is to be charged, the dielectric material is first preshaped, whereupon it can be charged according to the invention, e.g., in a partial vacuum. The shaping is normally carried out under pressure and at a high temperature. A precharged filter web may thereby lose part of its charge; such loss can be avoided by carrying out the charging after the shaping operation.

It is clear that the charging of the dielectric material is accompanied by simultaneous charging of the adjacent substantially closed separating foil. When the same separating foil is to be used in successive charging of a number of pieces of dielectric material, it appears that discharging said foil after each charging operation improves the charge on successive pieces.

Surprisingly, further improvement in charging is achieved if the separating foil, before being used for charging the dielectric material, is charged with a polarity opposite to that used for charging the material.

It has further been found that the dielectric material is charged more bipolarly, if it is pre-exposed to a charge with a polarity opposite to that used during charging.

A similar improvement in the bipolarity of the dielectric material can be achieved if before it receives its final charge it is subjected to an AC corona. Furthermore, it appears that filter material charged in an essentially gas-tight space at a lower pressure or at an overpressure is completely bipolar.

Polarity of the dielectric material may be determined by reading the surface potential of the web using a non-contacting probe such as the Monroe Isoprobe Electrostatic Voltmeter. Bipolar webs will show essentially zero readings due to the nearly complete compensation of charges of each polarity in the material by equal concentrations of charges of the opposite sign.

Because of the improved bipolarity of the dielectric filter material, the polarity of the charged particles to be filtered is not of importance and the strongly inhomogeneous fields produced in the filter results in improved capture of uncharged particles.

For high filter efficiency the dielectric filter material should preferably consist of very fine fibers.

The invention further relates to equipment for the continuous manufacture of an electret filter web, which equipment, in one embodiment, comprises a corona device in the corona of which an essentially closed dielectric foil extends substantially at right angles to the corona field. Said apparatus is characterized by the dielectric foil forming part of an endless belt guided around rotating rollers and by the corona device having at least one positive and one negative corona spanning between said part of the belt, in which span the dielectric material that lies against the belt is moved forward between the coronas.

In another embodiment of the equipment, a grounded metal electrode is located opposite the corona. The electrode comprises a rotating metal roller or a belt. The dielectric foil is placed on the circumference of the roller or on that side of the belt which faces the corona. The dielectric material situated on the dielectric foil is thereby transported through the corona. The dielectric foil may be adhered as a cover on the surface of the roller or belt.

It will be apparent that the dielectric material can also be transported between the dielectric foil and the metal roller or belt, the foil being pressed in the direction of the roller or belt so as to compress the dielectric material.

The invention also relates to an apparatus for manufacturing, in series production, a large number of electret filter webs from dielectric material with an open structure comprising a corona device in the corona of which a substantially closed dielectric foil mainly extends perpendicularly to the corona field. Said apparatus is characterized in that it incorporates a device for supplying foil and the dielectric material to be charged, this device is followed by a vacuum packing device, which packs the foil and the dielectric material into evacuated packages, and in that the corona device has a positive and a negative corona, between which the evacuated packages are transported.

Another embodiment of the present invention is characterized in that the electrode is a rotatable drum, the cylindrical circumferential wall of which is provided with holes and in that the blocking foil is guided at a certain distance from the cylindrical outer surface of the drum to obtain a feed-through space for the dielectric material, and in which the foil is drawn to the drum by evacuating the feed-through space through the holes in the drum wall opening into said space.

Preferably, the foil is an endless belt guided over rotatable rollers.

Still another embodiment according to the invention is characterized in that the interior of the drum opposite the holes in the drum wall opening into the feed-through space of the dielectric material contains a stationary body which, in the direction of the axis of the drum, has two sealing faces in close contact with the inner side of the cylindrical drum near the outermost holes opening into the feed-through space and in that the surface of the body extending between the sealing faces and facing the holes opening into the feed-through space is spaced from the drum wall so as to create a closed suction space connected to a suction conduit.

The invention will now be elucidated by drawings.

FIG. 1. shows an embodiment of an apparatus for charging the dielectric material according to the invention;

Figure 1:
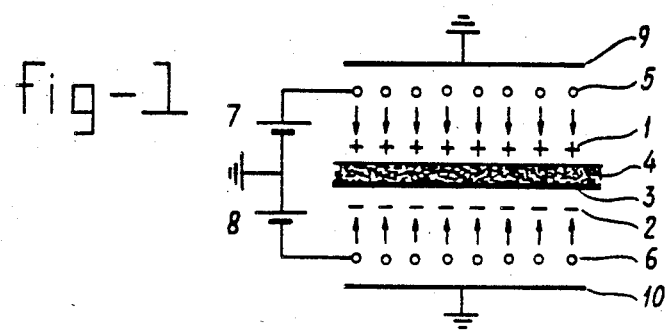

FIG. 5 presents an apparatus for carrying out the method according to the invention continously;

FIG. 6 shows another embodiment for carrying out the method according to the invention continuously;

FIG. 7 is a graph showing filter penetrations for electret filter mats of the invention versus the number of layers charged separately; and FIG. 8 is a graph illustrating the penetrations obtained in percent versus overpressure and underpressure, respectively, the charging having been carried out with four separate layers.

The invention will be described hereafter with reference to electret filters made from dielectric fiber material. It is clear, however, that other dielectric materials having an open structure, for example, dielectric foam, porous membranes, sintered powder, etc., can likewise be charged according to the present invention with the same advantages. It is also clear that the charged material may be used for purposes other than filtration.

Further, the fibers may be fine and/or coarse and take any shape such as round, lobed, rectangular, hollow and so on. Furthermore, it is also possible to charge staple fibers, non-woven, spun, melt-blown, solvent-blown or sprayed fibers or a mixture of several of these fibers. The dielectric filter material may comprise different layers, e.g., one coarse layer of fibers and a layer of fine fibers. If desired, several dielectric materials can be used for the layers.

The current trend in the design of filters is focussed on capturing not only coarse but also fine dust more and more effectively. This is of importance both in air conditioning systems and for personal protection because particles of a dimension less than one micrometer are the most dangerous. These particles can be inhaled and often contain heavy metals. Further, fine dust should be excluded from dust-free rooms ("clean rooms") in which micro-electronic components are manufactured and from intensive-care units in hospitals, etc. Further, in many manufacturing processes very fine dust is produced and atmospheric dust also contains many submicron particles which may be injurious to health.

In conventional fibrous filters, fine dust is captured effectively only if the fibers are very fine. The ability to capture fine particles is vastly improved by applying an electrostatic charge on the fibers. This forms the basis of the electret filters according to, e.g., the Dutch Pat. No. 160,303 or U.S. Pat. No. RE. 30, 782.

In the past, permanent electrostatic charging of a dielectric material with an open or porous structure, particularly fibers, has posed problems arising from undesirable dielectric breakdown. According to Dutch Pat. No. 160,303 or U.S. Pat. No. Re. 30,782, said breakdown is avoided by using a closed dielectric foil which is first stretched lengthwise, and then charged, and then fibrillated into fibers.

For a number of applications, fibers carrying an electrostatic charge need not be fine. The fibers in the electret filters described in Dutch Pat. No. 160,303 or U.S. Pat. No. Re 30,782, which patent is incorporated herein by reference, are relatively coarse because they are made from split fibers (10×40 micrometers). Although these fibers carry a high charge, they are deleteriously affected by very fine dust. As a result they are not especially useful for some long term applications such as in air conditioning systems.

The present invention opens new perspectives by making it possible to charge existing fiber webs made of micro-fine fibers. Several good methods are known for making micro-fine fibers and mixtures of micro-fine fibers and staple fibers. See e.g., German "Offenlegungsschriften" 2,328,015, 2,032,072 and 2,620,399; U.S. Pat. No. 4,230,650 and German "Offenlegungsschrift" 2,940,170. See also U.S. Pat. Nos. 3,016,559 and 4,118,531 and Van A. Wente, "Superfine Thermoplastic Fibers", *Industrial and Engineering Chemistry*, Vol. 48, p. 1342 et seq. (1956).

Referring now to the drawings, FIG. 1 shows an embodiment of an apparatus with which the method according to the invention can be carried out.

In this apparatus, two corona plasmas 1 and 2 are used, a positive and a negative one. Between the two corona plasmas 1 and 2, a substantially closed dielectric foil 3 is placed carrying the filter mat 4 to be charged. The dielectric foil 3 functions as a barrier separating the positive and negative ions, thereby blocking their mutual neutralization. Said foil is therefore referred to as a separating or blocking foil. The use of a corona, i.e., a plasma of air ions, as a counter-electrode instead of a metal electrode reduces the risk of spark breakdown through the separating foil. In addition, the combination of filter web and foil can be transported between the coronas at high speeds. The reduction of the risk of spark breakdown and the frictionless transport allow the use of a very thin (e.g., 2 micrometers thick) dielectric foil. This increases the charging of the fiber mat because the voltage loss across a thin foil is low. The use of thin foils is particularly useful in charging thin fiber fleeces.

The corona plasmas 1 and 2 are produced by thin tungsten wires 5 and 6 positioned respectively above and below the combination of the filter mat 4 and foil 3. The wires 5 and 6 are connected to positive and negative voltages of, e.g., 7 kV supplied by the voltage sources 7 and 8, respectively. By positioning the wires perpendicularly to the length direction of the filter mat, a uniform charge is deposited. In comparison to the known charging method with corona points, the corona wires have the advantage of being less vulnerable to damage, less easily contaminated and less subject to spark erosion. Moreover, wires afford a better charging geometry. The corona device is equipped with two grounded plates 9 and 10 which strengthen the ionization of the air so that many more ions are available for injection. Further, the grounded plates 9 and 10 render the arrangement electrically safe.

In the apparatus of FIG. 1, a wide-mesh dielectric gauze (not shown) may be pressed mechanically onto the dielectric material to be charged and separating foil 3. For that purpose, the foil 3 is stretched across a frame (not shown) which is mounted in a fixed position. Similarly, the gauze is stretched across a frame (not shown) and pressed in the direction of the foil.

Preferably, the charging of the filter material is carried out continuously, the filter material, as far as it is inside the corona device, being compressed continuously by the gauze turned round by means of a roller system (not shown).

The corona charging used is fast (may be completed in one second or less) and can be carried out at a range of temperatures, but preferably at room temperature.

The charges implanted into the dielectric material by the coronas are energetically bound to structural defects in the material, in other words they are captured in so-called "traps" (capturing centers). As noted, the charge storage in the traps can normally be achieved at room temperature. Only if the material also contains shallow traps in addition to deep traps, is it preferable to carry out the charging at a higher temperature, because high temperatures favour the filling of the deep traps, the shallow ones remaining empty.

The charge injection is so strong that one needs no longer to strive for the orientation of permanent dipoles in the filter material, so that one may start from dielectric materials without polar groups. Owing to the higher insulation resistance of said non-polar materials compared with that of polar materials, the stability of the injected charges is much better in the long run.

Several dielectric materials have been found to be suitable including such polymers as: polypropylene, linear low density polyethylene, polymethylpentene, polytetrafluoroethylene, polytrifluorochloroethylene, polystyrene, polycarbonate, polyester and others.

Superior charging can be achieved by compressing the dielectric material in the direction of its thickness during charging. This compression is possible because a filter contains much air, the filling or packing density, (volume of fibers/total volume) frequently being only a few percent. The filters can often be compressed to a thickness of one fifth or less of the original thickness.

The compression can be achieved in different ways. First, the filter mat can be compressed mechanically on the blocking foil, for example by means of a wide-mesh gauze. Further, the filter mat can be charged between two foils instead of one. In this case, the filter mat can be compressed by applying a pneumatic overpressure to the foils. Optionally, the filter mat can be compressed permanently, e.g., by compressing it in a high-pressure press, if desired at a high temperature, or by feeding it between hot-press rollers (calander). Compression can also be achieved in the process of molding the filter material into a shape such as a respirator.

Exceptionally good results are obtained when compression of the filter mat or fiber fleece is achieved by a pressure reduction. In that case, the fiber fleece is enclosed in a substantially gas-tight space, of which at least one of the boundaries (a major face) perpendicular to the direction of the thickness of the dielectric material is flexible. By reducing the pressure in said space the fiber fleece is compressed. The boundaries of said space may consist of, e.g., an upper and a lower foil. One of these foils may have, at least locally, a low porosity which allows one to create a certain underpressure within the space between the two foils. It appears that such low porosity has no effect on the blocking activity of the separating foil. Alternatively, the air may be sucked away at the edges of the filter mat, in which case the separating foil need not be porous.

The boundaries of the space may be formed by a so-called blown foil (tube) enclosing the fleece entirely and also capable of functioning as a separating foil during the charging process. The air is sucked away at the open end of the blown foil. If necessary, said blown foil may serve as packing later on, for protection against moisture and dust.

Surprisingly, it has been found that for the same reduction in thickness the charging at a reduced pressure gives a better result, i.e., a lower particle penetration, than do the other forms of compression.

The great advantage of the invention, in particular when compression is used, can be seen in Tables A, B, C, and D. Testing is according to British Standard 400, a test of the penetration of a standard dispersion of sodium chloride particles generated by nebulizing an aqueous solution of NaCl. The aerosol concentration is measured in a hydrogen flame. Air flow is at a velocity of 20 cm/sec.

The quantity Q is a figure of merit for filter media defined mathematically by the expression $$Q = \frac{-\ln(\% P/100)}{\Delta P} \quad (1)$$

where %P is the percent penetration, $\Delta P$ is the pressure drop in Pascals and ln indicates the natural logarithm. This figure of merit is always positive and increases with reduced penetration. Conversely, as pressure drop increases, the value of Q is reduced.

In the event that a filter web is made thicker by the addition of material, then the penetration of relatively fine particles is found to be well approximated by the mathematical expression $$\%P = 100e^{-k \cdot W} \quad (2)$$

where W is the basis weight, k is a constant and e is the base for the natural logarithm. Basis weight is defined as the weight per unit area of web, e.g., in grams per square meter. (This assumes that the additional material is of the same fiber, fiber orientation and degree of compaction as the original material and that interfacial effects and depth loading effects can be neglected).

Similarly, the pressure drop may be computed from the expression $$P = k' \cdot W \quad (3)$$

where k' is a constant and W is the basis weight.

Combining equations (1), (2) and (3) results in $$Q = k/k' \quad (4)$$

This demonstrates that Q is an index which is independent of the direct effect of the basis weight on filter performance. Thus, Q may be used to compare the filtration performance of webs of different basis weights. (See William C. Hinds, *Aerosol Technology: Properties, Behaviour, and Measurement of Airborne Particles*, John Wiley and Sons, New York, Chapter 9. If Q is different between two webs, it can be because either k or k', or both are different. k might be different because the fibers are differently charged. This is seen in the first two lines of Table A in which the beneficial effect of charging at reduced area weight and thickness is seen. Similarly, k' can be increased if the web is permanently compressed. This can be seen in the increased pressure drops observed in lines 5 and 6 of Table A.

TABLE A

| | charging | | penetration test with NaCl at 20 cm/sec (for separate charging, testing was done after reassembling) | | | |
|---|---|---|---|---|---|---|
| filter | total basis weight g/m² | thickness mm | basis weight g/m² | pressure drop Pa | penetration % | Q Pa⁻¹ |
| split fibers (not carded) | | | | | | |
| charged as one mat | 203 | 6.5 | 203 | 23 | 62 | .021 |
| in 4 layers charged separately | 36 | 1.5 | 142 | 18 | 30 | .067 |
| charged in vacuum as one mat | 196 | 1 | 196 | 23 | 31 | .051 |
| in 4 layers charged separately in vacuum | 41 | 0.2 | 165 | 20 | 5 | .150 |
| split fibers, compressed permanently charged in vacuum as one mat | 188 | 0.8 | 188 | 38 | 33 | .029 |
| in 4 layers charged separately | 40 | 0.35 | 161 | 41 | 5 | .073 |

TABLE A-continued

| filter | charging total basis weight g/m² | thickness mm | penetration test with NaCl at 20 cm/sec (for separate charging, testing was done after reassembling) | | | |
|---|---|---|---|---|---|---|
| | | | basis weight g/m² | pressure drop Pa | penetration % | Q Pa⁻¹ |
| in vacuum | | | | | | |

Table A relates to a non-carded filter web from polypropylene split fibers. These are relatively coarse and rectangular in cross section (dimensions 9×45 micrometers). The filter material was charged in two ways: i.e., without compression with one separating foil; and in vacuum, with compression between two separating foils. The charging was carried out on an apparatus similar to that illustrated in FIG. 1 in about 1 second at 25° C. with corona voltages of ±7 kV and with one or two 2 micrometer thick blocking foils of Mylar, the two foils forming a substantially gas-tight enclosure for charging in partial vacuum (only one foil being shown in FIG. 1).

The table shows that free charging in four layers instead of one reduces the salt penetration from 62 to 30%. A comparable result was obtained when the entire mat was charged at one time in a partial vacuum of 30 kPa. A much better result was obtained when the filter material was charged in a partial vacuum of 30 kPa in four layers, then the salt penetration was reduced to a mere 5%.

In the two final examples the filter material was compressed permanently in a press under a high pressure of 11.8 MPa at 25° C. which prevents the material from regaining its original height after charging. These examples also reveal the surprising benefit of charging in four layers in a vacuum.

In Table B, the filter material was made of polypropylene fibers and charged in one layer or a stack of layers superimposed. The charging was carried out on an apparatus similar to that illustrated in FIG. 1 in a partial vacuum of 30 kPa at room temperature, in about 1 second, and with corona voltages of ±7 kV, and two separating foils of 2 micrometer thick Mylar, the latter foils forming a substantoially gas-tight space (only one foil being shown in FIG. 1).

The very fine fibers are melt blown polypropylene microfibers produced by the method described in Van A. Wente, "Superfine Thermoplastic Fibers", *Industrial and Engineering Chemistry*, Vol. 48, pp. 1342 et seq. (1956). The fibers are a mixture of sizes ranging from submicrometer to several micrometers in diameter.

The fine fibers are a mixture of melt blown polypropylene fibers as described above and polypropylene staple fibers, of approximately 25 micrometers diameter, added in a proportion of approximately 30% by weight, using a method described in U.S. Pat. No. 4,118,531.

The respirator filling is a very fine fiber similar to the above very fine fiber taken from a 3M Company Type 8710 dust and mist disposable respirator.

Table B demonstrates that charging and compression in a partial vacuum affords efficient charging of filter materials of a high basis weight and high thickness. This is borne out particularly by the results for the filter material composed of a mixture of fine fibers and coarse fibers. For example for a basis weight of 318 g/m² and a filter thickness of 5.8 mm, the salt penetration decreases from 25% to 0.5% after charging in a partial vacuum. Even material having a basis weight of 450 g/m² and a thickness of 8.7 mm can still be charged.

The test results listed in Table B for very fine fibers show that four layers having a total basis weight of 133 g/m² and a total thickness of 1.8 mm can be charged simultaneously, whereby the salt penetration decreases down to 0.7% after charging. The laminated filter material of face masks can also be charged quite efficiently in a stack of four layers. The salt penetration then falls from 9 to 1.2%.

Although, the use of compression during charging (or before charging but permanently) greatly improves the filter efficiency (defined in percent as 100 minus the penetration in percent), it still remains profitable to build up a filter web from layers, charged separately under compression and later assembled into one web. This is demonstrated by Tables C and D.

TABLE B

| filter material | total number of layers | total basis weight g/m² | total thickness mm | penetration test NaCl at 20 cm/sec | | | | |
|---|---|---|---|---|---|---|---|---|
| | | | | pressure drop Pa | penetration | | Q | |
| | | | | | before charging % | after charging % | before charging Pa⁻¹ | after charging Pa⁻¹ |
| very fine fibers | 1 | 34 | 0.45 | 43.4 | 70 | 6.7 | .0082 | .062 |
| | 2 | 61 | 0.9 | 72 | | 1.8 | | .056 |
| | 3 | 99 | 1.35 | 105 | | 1.5 | | .040 |
| | 4 | 133 | 1.8 | 136 | | 0.7 | | .036 |
| fine and coarse fibers mixed | 1 | 146 | 2.9 | 76 | 50 | 2.3 | .0066 | .050 |
| | 2 | 318 | 5.8 | 149 | 25 | 0.5 | .0093 | .036 |
| | 3 | 450 | 8.7 | 258 | 16 | 0.3 | .0071 | .023 |
| respirator filling (fine fibers + carrying web) | 4 | 428 | 3 | 447 | 9 | 1.2 | .0054 | .010 |

TABLE C

| during charging | | penetration test with NaCl at 20 cm/sec | | | |
|---|---|---|---|---|---|
| compression | division | pressure drop Pa | thickness each layer mm | penetration (with division, measured after stacking all layers together) % | Q Pa⁻¹ |
| no | no | 20 | 12 | 60 | .026 |
| no | in 4 layers | 18 | 6 | 30 | .067 |
| compressed twice | in 4 layers | 18 | 2.6 | 20 | .089 |
| vacuum | in 4 | 20 | .2 | 6 | .141 |

TABLE C-continued

| during charging | | pressure drop Pa | thickness each layer mm | penetration (with division, measured after stacking all layers together) % | Q Pa$^{-1}$ |
|---|---|---|---|---|---|
| compression | division | | | | |
| (1.33 kPa) overpressure | layers in 4 | 22 | .4 | 14 | .089 |
| (32 kPa) compressed permanently | layers in 4 layers | 71 | .4 | 7 | .037 |

Table C relates to the filter properties of polypropylene split fiber filters of 190 g/m$^2$, compressed during charging and/or charged in four layers. The charging was performed at 25° C. in an apparatus similar to that illustrated in FIG. 1 in about 1 second with corona voltages of about ±7 kV. The compression was achieved respectively by compression with an open gauze lying over the filter, by vacuum suction and under the action of an overpressure. In the fourth and fifth lines of the Table, the filter web was enclosed between two blocking foils sealed together. In the fourth line, the space betwen the two foils was evacuated down to a pressure indicated in the Table, whereas in the fifth line the two foils were pressed together by an overpressure of 30 cm Hg produced in a chamber enclosing the entire apparatus with provision made for escape of air from the otherwise gas-tight space limited by the blocking foils. Lastly, a filter was compressed permanently by compression in a high-pressure press at room temperature under a pressure of 11.8 MPa. In the latter case, the filter web did not recover, so the pressure drop was higher, viz., 71 Pa instead of 20 Pa. The results of free charging without compression show that the salt penetration decreases from 60 to 30% by dividing the filter web into four layers. A two fold compression reduces this to 20%. Vacuum and compression by overpressure are more effective, for they result in a decrease in penetration to 6% and 14% respectively.

TABLE D

| | charging | | total | | | |
|---|---|---|---|---|---|---|
| filter material | basis weight g/m$^2$ | thickness mm | basis weight g/m$^2$ | pressure drop Pa | penetration % | Q Pa$^{-1}$ |
| split fibers | | | | | | |
| discharged with X-rays | | | 160 | 19 | 90 | .0055 |
| charged with | 36 | 1.5 | 142 | 18 | 30 | .067 |
| B-foil charged in vacuum fine fibers | 41 | 0.2 | 165 | 20 | 5 | .150 |
| discharged with X-rays | | | 165 | 75 | 52 | .0090 |
| charged with | 144 | 2.8 | 144 | 60 | 18 | .029 |
| B-foil charged in vacuum very fine fibers | 146 | 0.9 | 146 | 76 | 2 | .052 |
| discharged with X-rays | | | 34 | 47 | 85 | .0035 |
| charged with | 33 | 0.4 | 33 | 41 | 15 | .046 |
| B-foil charged in vacuum | 33 | 0.2 | 33 | 49 | 5 | .061 |

Table D lists the charging results for three types of filter material of polypropylene, viz., split fibers, fine and very fine fibers. The fine and very fine fibers are the same as described for Table B. The charging lasted about 1 second and was done at 25° C. with corona voltages of ±7 kV, and with a blocking foil for 2 micrometer thick Mylar, again in the apparatus as illustrated in FIG. 1, except that sealed bags of blocking foil were used for the vacuum charging. Before being charged, the split fiber web was divided into four layers, which were reassembled into a single fiber web after being charged separately. The Table again shows that the NaCl penetration of the split fiber webs are lowest when vacuum charging is used. The latter method reduces the penetration from 90 to 5%. This may be due to the high compression of the filter web, whose thickness decreases from 1.5 to 0.2 mm. The X-ray discharge is used to provide samples wnich are known to be completely uncharged.

The filter webs of fine and very fine fibers were not divided. The penetrations achieved for these webs (of 146 g/m$^2$ and 33 g/m$^2$) were 2% and 5% respectively after vacuum charging. Their free charging, i.e., without compression, also gave quite good results, viz. salt penetrations of 18% and 15% respectively.

By the method of the invention it is even possible to charge existing filters permancntly to produce electret filters. An example of this is given in Table E.

TABLE E

| | | | penetration test NaCl at 20 cm/sec | | |
|---|---|---|---|---|---|
| filter material | basis weight g/m$^2$ | post-charging | total pressure drop Pa | total penetration % | Q Pa$^{-1}$ |
| highly efficient bag filter | | | | | |
| covering web | 82 | no | 164 | 22 | .0092 |
| micro-fine polycarbonate fibers | 72 | } 203 | | | |
| carrier web | 49 | | | | |
| micro-fine polycarbonate | 121 | vacuum | 164 | 4.5 | .019 |

TABLE E-continued

| filter material | basis weight g/m² | post-charging | penetration test NaCl at 20 cm/sec | | |
|---|---|---|---|---|---|
| | | | total pressure drop Pa | total penetration % | Q Pa⁻¹ |
| fibers + carrying fleece | | | | | |

Table E lists the test results for a highly efficient commercially available bag filter. The micro-fine fiber material is manufactured by Carl Freudenberg according to the method of British Pat. No. 1,346,231. Said filter was subjected, according to the invention, to post-charging using apparatus such as illustrated in FIG. 1 together with sealed, evacuated covering foils. The bag filter consisted of a carrying web carrying the filter layer proper consisting of micro-fine polycarbonate fibers, which in their turn are protected with a covering web. The Table shows that post-charging reduces the penetration from 22% to 4.5%.

Since the charging is carried out with two corona plasmas, not with rigid charging electrodes, even pre-shaped non-planar filter material can also be charged. Such materials are used, e.g., in respirators. The pre-shaping into a "cup" is often carried out under pressure and at a high temperature. Charged filter material may lose thereby some of its charge. This is avoided by carrying out the charging after the shaping.

The charging is preferably conducted in a partial vacuum, the pre-shaped filter material being enclosed in a thin blown foil tube in which the pressure is reduced. The coronas are located above and below the filter material. For optimum charging, their shape should be adapted to that of the curved mask. If necessary, the corona on the concave side of a face mask can be substituted with a thin metal foil. Alternatively, the separating foil can be metallized on the concave side. These foils have the advantage of adapting themselves nicely to the curved surface of the mask, particularly when a vacuum is applied.

Another option is to position a corona on the hollow side, a current of air being circulated in that cavity in such a way that the ions are blown against the separating foil.

A respirator generally consists of three layers: a protecting covering web, the filter web proper made of micro-fine fibers and a carrying web. The filter efficiency of the covering web and the carrying fleece is low, because these consist of relatively coarse fibers. The covering layer is primarily intended for imparting a certain rigidity to the mask. It is preferable not to charge the relatively thick and heavy covering layer, because such a charging otherwise would impair that of the filter layer proper (which is thin and light). Table F includes an example of a complete respirator post-charged in a vacuum. In this case, a 3M Company Type 8710 dust and mist disposable respirator was used. Again the apparatus and charging conditions are similar to those used in previous examples.

TABLE F

| filter material | basis weight g/m² | post-charging | penetration test NaCl at 20 cm/sec | | |
|---|---|---|---|---|---|
| | | | total pressure drop Pa | total penetration % | Q Pa⁻¹ |
| face mask | | | | | |
| covering fleece | 202 | no | 127 | 23 | .012 |
| microfine polypropylene fibers | 60 | | | | |
| carrier fleece | 40 | | | | |
| covering fleece + fibers + carrier fleece | 302 | vacuum charging | 127 | 17 | .014 |
| fibers + fleece | 100 | vacuum charging | 127 | 2 | .031 |

Evidently, post-charging reduces the salt penetration by a factor of 1.4. A much higher gain is obtained when instead of the complete ready-made filter, only the polypropylene fiber fleece is charged together with the carrying web. This gain is made owing to the heavy covering fleece being composed of coarse fibers and so hardly contributing to the capture of fine dust, whereas it requires a large portion of the charging voltage.

Table G, which illustrates the results of the simultaneous vacuum charging of a stack of three superposed layers of fine fiber material as before, shows that even when vacuum charging is used, it still pays to build up a filter mat from thin layers charged separately.

Again in these example apparatus as shown in FIG. 1 was used, with sealed, evacuated foils and corona operating as in the previous examples. Charging is at room temperature.

TABLE G

| filter material | filter layer | basis weight g/m² | penetration NaCl at 20 cm/sec % |
|---|---|---|---|
| fine fibers charged in vacuum | top | 140 | 9.5 |
| | center | 130 | 23 |
| | lower | 140 | 13.5 |

Table G shows that the penetration of the central layer is less satisfactory (higher penetration) than that of the outer ones. The lower charging of the central layer will have less effect on the total performance when the stack has a lower thickness, in other words, when a thin web is charged. The thin webs are stacked together to form a single filter web after being charged separately, whereupon the coherence of the layers is improved by, for example, needle tacking or heat sealing.

In view of what has been said, the fiber web should be as thin and/or as light as possible and/or the compression should be as high as possible in order to acquire the highest possible charging. However, little additional benefit is gained by exceeding a certain number of layers, or using less than a certain underpressure or more than a certain overpressure. This is shown by the curves in FIGS. 7 and 8.

The curves in FIG. 7 represent test results for a filter web of polypropylene split fibers with a basis weight of 185 g/m$^2$ under several charging conditions. The ordinate gives the penetration data in percent, measured in a NaCl test at 20 cm/sec. The abscissa gives the number of layers, with which the filter is charged. Curves a, b, c and d relate to, respectively, free charging, charging with a twofold compression, charging at a partial vacuum of 30 kPa and charging of a filter permanently compressed previously at a pressure of 11.8 MPa at room temperature.

FIG. 8 presents the test results for a similiar filter mat as in FIG. 7. The same NaCl test was used. Along the ordinate again the penetration in percent is plotted, whereas the abscissa gives the overpressure or underpressure in kPa. Curve a pertains to charging in four layers under overpressure, whereas curve b gives the results for charging in four layers in a partial vacuum; in both cases the filter medium was charged between two blocking foils of 2 micrometer thick Mylar, at 25° C. with corona voltages of ±7 kV, in an apparatus similar to that shown in FIG. 1.

The separating foil should preferably make intimate contact with the material to be charged, particularly when this is a thin web. Said close contact is promoted by taking a thin easyily pliable separating foil, because such a foil conforms well to the contours of the web, the more so because it is aided in doing so by the electrostatic attraction between the fiber web and the foil.

If, for example, the material to be charged is a web of flat split fibers, the web is preferably tensioned in the plane of the separating foil so as to improve mutual contact and thereby optimize the charging of the fibers. The use of thin separating foils for charging thin fiber webs is advantageous, because they give a lower voltage loss than do thick foils.

The separating foil may consist of a thin foil of a variety of insulating polymers, e.g., polyethyleneterephthalate (PET), polypropylene (PP), polyethylene (PE), polytetrafluoroethylene (PTFE). PET of 2 micrometer thickness and polypropylene of 10–50 micrometer thickness afford good results.

Furthermore, it appeared that the thinner the webs to be charged, the thinner the separating foil should be.

Decay experiments with filter material of polypropylene split fibers charged in a vacuum have shown that the penetration rises from 3.2 to 5% when the filter material was exposed to a humid atmosphere with a relative humidity of 100% at an elevated temperature (45° C.) for 34 days. The stability therefore seems to be very good.

When in successive charging operations the same blocking foil is used, said foil is found to be charged strongly with a polarity corresponding to the polarity of the charge carriers to be implanted. Discharging the foil between successive charging operations, preferably by means of an AC corona, affords an improvement in the charge by about 10%. Seemingly, the charge of the foil, where it contacts the fibers, counteracts the charging of the fibers. Surprisingly, it is found that opposite poling of the foil raises the charge on the fibers further. By opposite poling is meant that, before charging the web, the foil acquires a polarity opposite to that of the final charge carriers to be implanted.

Table H shows the effect of said respective discharging and opposite charging operations on the blocking or B-foil.

TABLE H

| filter material | B-foil | basis weight g/m$^2$ | pressure drop Pa | penetration NaCl at 20 cm/sec % | Q Pa$^{-1}$ |
|---|---|---|---|---|---|
| charged split fiber fleece | not discharged | 195 | 26 | 5.8 | .110 |
| | discharged | 200 | 25 | 4.8 | .121 |
| | charged (with opposite polarity) | 170 | 15 | 5.4 | .195 |

Figure 2:
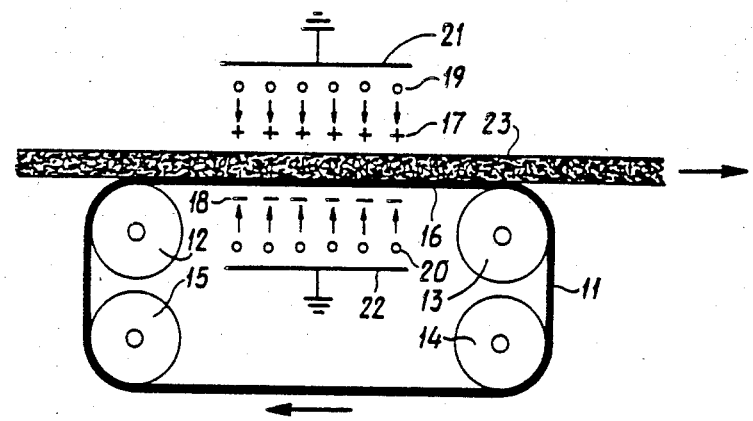
FIG. 2 illustrates an apparatus allowing the method according to the present invention to be carried out continously.
Figure 3:
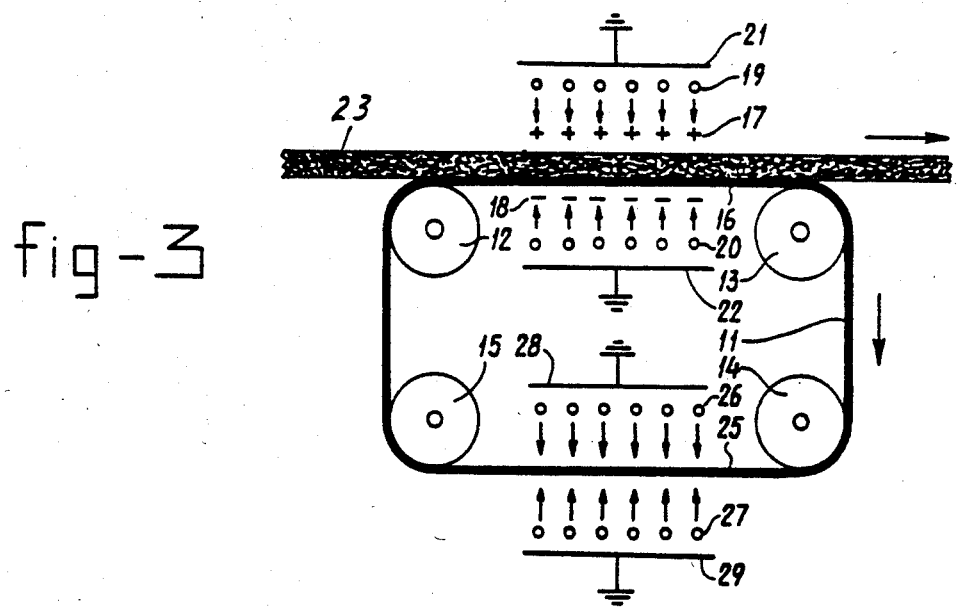
FIG. 3 is an elaboration of the embodiment shown in FIG. 2.

The results shown in Table H were obtained at a charging temperature of 25° C., a feeding speed of 10 m/min., corona voltages of ±7 kV, and a corona length of 20 cm in an apparatus of the type illustrated in FIG. 2, or for the case of discharged or oppositely charged foil, in FIG. 3.

From a quick glance at Table H, it appears that charging of the B-foil with an opposite polarity does not produce any appreciable improvement over discharging the B-foil. It should be noted, however, that in the example involving charging of the B-foil, the filter material had a lower basis weight, viz., 170 g/m$^2$. On an equal weight basis, the gain in penetration by opposite charging would be higher (c.f., also the differences in pressure losses). This point is demonstrated in the value of Q.

It is known that a positive corona contains only very few negative ions ($10^{-3}$) times the the number of the positive ones) and vice versa (see R. S. Sigmond in "Electrical Breakdown of Gases", page 361, Wiley, New York, 1978 edited by J. M. Meek and J. D. Cragg). Fibers charged freely on a blocking foil with a positive corona are therefore expected to carry a unipolar positive charge. Surprisingly, however, the fibers are not charged unipolarly, but nearly bipolarly, probably owing to a fortuitous charging process with a polarity opposite to the charging polarity. Said opposite charging probably occurs when the filter material is no longer subjected to the corona charging and is removed from the blocking foil.

The bipolarity obtained is favorable because charged particles are then trapped effectively regardless of the sign of their charge. Moreover, bipolarity also favors the capture of uncharged particles, because it produces strongly inhomogeneous electrostatic fields.

However, it has been found that fibers charged freely or with mechanical compression by application of a positive or negative corona, do carry a surplus of positive or negative charges, respectively. The bipolarity seems to be more balanced when the fibers are charged in a closed space under an overpressure or underpressure.

The bipolarity of the fibers can be improved in free charging by subjecting the dielectric material, first to a corona with a polarity opposite to the corona polarity applied during the final charging. Said free charging is hereafter referred to as pre-filling. Table J shows that pre-filling improves the penetration results.

TABLE J

| pre-filling | basis weight g/m² | pressure drop Pa | penetration NaCl at 20 cm/sec % | $\frac{Q}{Pa^{-1}}$ |
|---|---|---|---|---|
| none | 142 | 18 | 30 | .067 |
| with ions of opposite polarity | 140 | 19 | 24 | .075 |

Although an AC corona produces both positive and negative ions it appears, surprisingly, that prefilling by means of an AC corona instead of a DC corona gives about the same result.

The results of Table J were obtained upon charging polypropylene split fibers in four layers at 25° C. for 1 second at corona voltages of about ±7 kV and with a 2 micrometer thick Mylar blocking foil. Pre-filling was achieved by charging on an apparatus of the type shown in FIG. 1 but without a blocking foil. The actual charging was then carried out with a blocking foil.

So far, the invention has been described as a discontinuous process, but the methods described are preferably carried out continuously.

FIG. 2 shows an embodiment of an apparatus for carrying out the method according to the invention continuously. In said apparatus, the separating foil is formed by an endless belt 11 of a substantially closed dielectric foil running over rollers 12–15. These rollers are free to rotate in a frame (not shown). The upper part 16 of the endless belt 11 runs through a double corona device which has, on each side of the part 16, the positive corona plasma 17 and the negative corona plasma 18, respectively. The coronas 17 and 18 are produced by the tungsten wires 19 and 20 connected to high voltage source (not shown) of +7 kV and −7 kV, respectively. At the side facing away from the coronas the grounded plates 21 and 22 are located. The dielectric material with its open structure, in particular the fiber web 23, is transported between the two coronas in contact with part 16 of the endless belt 11. The tungsten wires 19 and 20 are perpendicular to the feeding direction for the purpose of achieving a uniform charging of the fiber web 23.

The apparatus shown in FIG. 3, for the continuous charging of fiber web 23, is similar to the apparatus of FIG. 2 with respect to the charging operation. Consequently, corresponding parts bear the same reference number. In the apparatus of FIG. 3 an additional corona device is used in which part 25 is discharged with an AC corona produced by the tungsten wires 26 and 27 or charged with a polarity opposite to that produced by the upper corona device. In the additional lower corona device, the grounded plates 28 and 29 can be seen again.

The endless belt 11 of the apparatuses shown in FIGS. 2 and 3 may be formed by a grounded metal belt whose outer surface is covered with dielectric material. In this arrangement, the corona wires 20 and 26 with the grounded plates 22 and 28 are omitted. Preferably, the cover adheres to the surface of the belt. If desired, the endless belt 11 may consist of dielectric foil metallized on its inner side.

Figure 4:
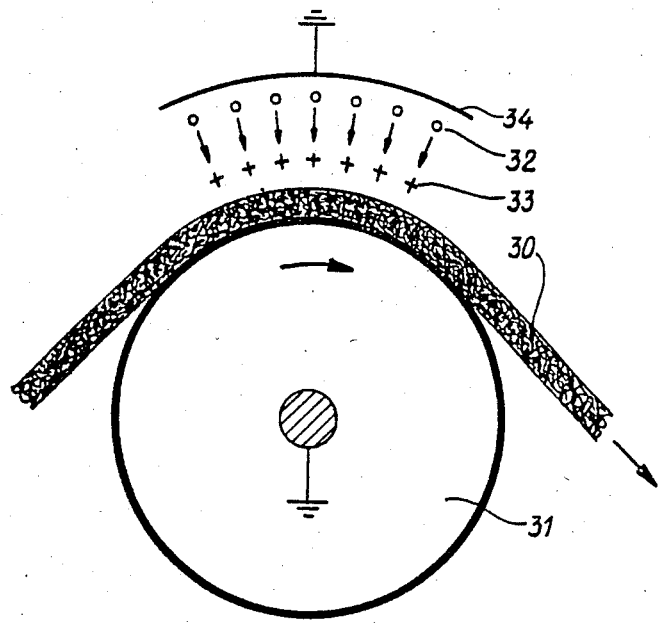
FIG. 4 shows another embodiment for carrying out the method according to the invention continously.

In the apparatus shown in FIG. 4, a fiber web 30 is charged in a continuous process by means of a one-sided corona device. Said fiber web 30 is guided over a rotating metal roller 31 which is grounded. The separating foil is put on the circumference of the roller 31 and preferably adheres as a cover to its surface. Above that part of the fiber web 30 that lies against the foil or cover, a corona device with corona wires 32 is located. Connected to a voltage source (not shown) of e.g., +7 kV, the corona wires 32 produce a positive corona plasma 33 for charging the fiber web 30. On the side of the corona wires 32 facing away from the corona, a grounded metal plate 34 is placed. It is clear that the fiber web can also be charged with a negative corona, for which purpose a negative voltage source of, e.g., −7 kV has to be connected to the corona wires 32.

Although not shown, the blocking foil on the roller is discharged or counterpoled continuously, e.g., with a corona device.

The separating foil may also be placed between the fiber web 30 and the corona plasma 33, said foil in this case being guided, as an endless belt made from a substantially closed dielectric material, over a number of rollers in a way not shown. Preferably, the fiber web 30 is pressed with the foil belt against the metal roller, e.g., by means of rollers (not shown). The resulting compression of the fiber web markedly improves its charging.

The same position of the foil and the pressure it exerts in the direction of the fiber web may also be applied in the apparatuses according to FIGS. 2 and 3, when the endless belt 11 consists of a grounded metal belt.

Further, the compression of the fiber web may be achieved by stretching a belt of gauze material over the web in a way not shown. For that purpose, an endless belt of gauze material is guided over rotating rollers. That part of said belt engaging the web is pressed against it by pressing the rollers on both sides of said part in the direction of the web.

FIG. 5 is a diagram of an embodiment of an apparatus suitable for continuous charging of packages of filter material. The filter material 112 wrapped on a reel 113 is unwound from that reel and supplied to a vacuum packing device 114 through a supply device (not shown). A blown foil tube 115 wound on reel 116, is unwound therefrom and supplied to the packing device 114 through a supply device, likewise not shown. In said packing device 114, the supplied filter material 112 and blown foil 115 are vacuum-packed. Band 117, thus fabricated of packages of filter material, is fed through a corona device comprising the corona wires 118 and 119 and the grounded metal plates 120 and 121. The voltages indicated by + and − on the corona wires 118 and 119, respectively are generated by voltage sources (not shown) of e.g., +7 kV and −7 kV, respectively. The band of packages 117 may be wound on a reel for storage or transport to the consumer. During storage or transport the filter material is protected from moisture and dust by its packing. Packages can of course, be cut from band 117 after leaving the corona device, and stored or transported separately. After removal of the blown foil from the packages, the filter material is immediately available for use in filters.

In the apparatus shown in FIG. 5, the filter material is enclosed between two foils and charged in a two-sided corona device. However, the filter material can also be charged between a blocking foil and a grounded metal counter-electrode with either a positive or a negative corona. The results are given in Table K.

TABLE K

| charging method for filter mat | basis weight g/m² | pressure drop Pa | penetration NaCl at 20 cm/sec. % | corrected penetration NaCl at 20 cm/sec % |
|---|---|---|---|---|
| between 2 blocking foils and with 2 coronas | 178 | 22 | 6 | 6 |
| between 1 blocking foil and metal counterelectrode and with 1 corona | 135 | 20 | 12 | 6.1 |

Table K lists the penetration results of split fiber filters charged in a vacuum (in four layers) in two ways. The charging was carried out with corona voltages of ±7 kV, at 25° C. in 1 second and with a 2 micrometer thick Mylar foil. Table K compares at the same time two corona charging methods, viz., charging between two foils, with two coronas, and charging between a blocking foil and a grounded metal counter-electrode, with one corona. A quick glance shows that the second charging is less efficient, because the measured salt penetration is higher. However, the web weight in this case is 1.3 times lower. If a correction is made using equation (2), the salt penetrations are quite similar.

In the apparatus shown in FIG. 6, fiber web 122 is charged in a continuous process by means of a one-sided corona device and with one blocking foil. Said fiber web 122 is guided over a rotatable and grounded metal drum 123. A corona device with corona wires 124 is mounted above that portion of the fiber web 122 which lies against drum 123. The corona wires 124, connected to a voltage source of, e.g., +7 kV (not shown), produce a positive corona plasma 125 for charging fiber web 122. A grounded metal plate 126 is placed at that side of the corona wires 124 that lies opposite the corona plasma. It is clear that fiber web 122 can also be charged with a negative corona, for which purpose a negative voltage source of, e.g., −7 kV, is connected to the corona wires 124.

Separating foil 127 is placed between fiber web 122 and corona plasma 125, said foil being guided over rollers 128 and 129 as an endless belt of substantially closed dielectric foil. Preferably, that part of the foil belt which adjoins fiber web 122 presses against this web, e.g., by forcing rollers 128 and 129 down. The fiber web is thereby compressed which improves the charging. This can be improved further by discharging the separating foil 127, or by continuously poling it with an opposite polarity by means of the device 130. Said device may contain either an AC corona device, or a corona device imparting to the belt a polarity opposite to that of the corona wires 124.

Still better results are achieved when the charging is carried out in a partial vacuum. For this purpose, drum 123 is provided with holes 131. The interior of drum 123 contains a stationary body 132 provided with labyrinth sealings 133 and 134 near the inner surface of drum 123. Suction space 135 is defined by the inner wall of drum 123 and a recess 136 in the surface of body 132.

Suction space 135 and the labyrinth sealings 133 and 134 extend in the direction of the axis of drum 123. The pressure in suction space 135 is reduced by a vacuum pump via a suction conduit (both not shown). Through holes 131 in drum 123 suction space 135 communicates with space 137 for feeding through fiber web 122. The underpressure established in the feed-through space is nearly equal to that in suction space 135. The reduced pressure in feed through space 137 forces foil 127 against drum 123, compressing the fiber web and causing the charging to take place in a partial vacuum.

Further, rollers 138 and 139 are provided for guiding fiber web 122 in the desired direction.

Although the above is largely concerned with split fibers, the methods of the invention also allow charging of other fiber structures, e.g., melt blown fibers and others.

When electret split fibers are used in dust filters, it is desirable that the fibers are crimped in order to increase their dust-catching capacity. The method described in Dutch patent application 7614376 in which a closed foil, e.g., blown foil is charged on both sides provides highly bipolarly charged fibers. However, the attraction of oppositely charged surfaces of the fibers causes an undesirable attraction force that opposes the crimping of, e.g., bicomponent split fibers. The fibers manufactured by the invention are slightly charged unipolarly and thereby mutually repel one another so that crimping is not prevented. Therefore, the fibers are preferably charged after crimping.

Fiber webs obtained by fibrillation of foils, in particular blown foils, can be charged in a number of ways. For instance, from blown foil tube two flat foils can be obtained. After fibrillation, one foil can be bombarded with positive charges and the other with negative charges, whereupon they are assembled into a so-called macrobipolar filter web. Alternatively, one of the foils can be left unfibrillated in order to serve as the separating foil for the second fibrillated foil.

We claim:

1. A method for manufacturing an electret filter medium from a dielectric material with an open or porous structure, comprising the steps of:
    continuously feeding a web of said dielectric material with a substantially closed non-fibrous dielectric foil adjacent to at least one major face thereof into a corona discharge device;
    reducing the thickness of said web of dielectric material to achieve upon charging a web of superior filtration efficiency; and
    charging said web of reduced thickness dielectric material by means of a corona discharge.

2. A method according to claim 1 wherein the thickness of the dielectric material is reduced by compression.

3. A method according to claim 2 wherein said compression is achieved by applying a pneumatic overpressure to said substantially closed dielectric foil overlying said web of dielectric material.

4. A method according to claim 2 wherein said compression is achieved by laying an open gauze or net onto said dielectric material and pressing said open gauze or net against said dielectric material.

5. A method according to claim 2 wherein the thickness of the dielectric material is temporarily reduced during charging.

6. A method according to claim 2 wherein the thickness of the dielectric material is permanently reduced prior to charging.

7. A method according to claim 1 wherein the dielectric material is temporarily stretched during charging.

8. A method according to claim 7 wherein the dielectric material is temporarily stretched along its length.

9. A method according to claim 7 wherein the dielectric material is temporarily stretched along its width.

10. A method according to claim 7 wherein the dielectric material is temporarily bidirectionally stretched.

11. A method according to claim 1 wherein the thickness of the dielectric material is reduced by placing said dielectric material within a substantially gas-tight enclosure, at least one major boundary of which is flexible and extends along a major face of said dielectric material, and reducing the pressure within said substantially gas-tight enclosure.

12. A method according to claim 1 wherein the substantially closed non-fibrous dielectric foil is discharged between successive charging operations.

13. A method according to claim 1 wherein the substantially closed non-fibrous dielectric foil is charged with a polarity opposite to the polarity used for charging said web of dielectric material.

14. A method according to claim 1 wherein the web of dielectric material is subjected to a precharging with a polarity opposite to the polarity used for the final charging of said web of dielectric material.

15. A method according to claim 1 wherein the web of dielectric material is subjected to AC-corona before final charging.

16. A method according to claim 1 comprising the additional step of stacking a plurality of charged webs of said dielectric material to form a composite electret filter medium.

17. A method according to claim 16 wherein said plurality of charged webs is unified by needle tacking or heat sealing.

18. A method according to claim 1 wherein the thickness of the web of dielectric material is permanently reduced by preshaping said web.

19. A method according to claim 1 wherein the dielectric material comprises a web of dielectric fibers.

20. A method according to claim 19 wherein the web of dielectric fibers comprises a mixture of coarse fibers and fine fibers.

21. A method according to claim 19 wherein the web of dielectric material comprises a stack of a plurality of individual webs formed of coarse dielectric fibers and fine dielectric fibers.

* * * * *